(12) United States Patent
Olenick et al.

(10) Patent No.: US 9,740,512 B2
(45) Date of Patent: Aug. 22, 2017

(54) VIRTUALIZING EXTENSION CODE IN AN APPLICATION

(71) Applicant: Microsoft Technology Licensing, LLC, Redmond, WA (US)

(72) Inventors: Brad M. Olenick, Kirkland, WA (US); Leon E. Welicki, Issaquah, WA (US); Alvaro R. Dias, Bellevue, WA (US); Madhur Joshi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/956,106

(22) Filed: Dec. 1, 2015

(65) Prior Publication Data

US 2017/0010872 A1    Jan. 12, 2017

Related U.S. Application Data

(60) Provisional application No. 62/191,446, filed on Jul. 12, 2015.

(51) Int. Cl.
*G06F 9/44* (2006.01)
*G06F 9/445* (2006.01)
(52) U.S. Cl.
CPC ................. *G06F 9/44526* (2013.01)
(58) Field of Classification Search
None
See application file for complete search history.

(56) References Cited

U.S. PATENT DOCUMENTS

| 8,843,822 | B2 | 9/2014 | Claux et al. |
|---|---|---|---|
| 2005/0055315 | A1 | 3/2005 | Darweesh et al. |
| 2007/0156913 | A1* | 7/2007 | Miyamoto .......... G06F 9/44526 709/230 |
| 2007/0174824 | A1 | 7/2007 | Relyea et al. |
| 2009/0193444 | A1 | 7/2009 | Clark et al. |
| 2010/0229157 | A1 | 9/2010 | Ergan et al. |
| 2010/0306735 | A1 | 12/2010 | Hoff et al. |
| 2013/0055285 | A1 | 2/2013 | Merry et al. |
| 2013/0185362 | A1 | 7/2013 | Clagg et al. |
| 2013/0282642 | A1 | 10/2013 | Claux et al. |
| 2013/0283139 | A1 | 10/2013 | Claux et al. |

OTHER PUBLICATIONS

"Extension—Overview", Published on: Feb. 28, 2014, 15 pages, Available at: https://developer.chrome.com/extensions/overview.
"Extension—Event pages", Published on: Apr. 11, 2005, 6 pages, Available at: https://developer.chrome.com/extensions/event_pages.

(Continued)

*Primary Examiner* — Qamrun Nahar
(74) *Attorney, Agent, or Firm* — Wade IP Law LLC

(57) ABSTRACT

Techniques are described herein that are capable of virtualizing extension code (e.g., third-party extension code) in an application (e.g., a web application in a browser). A portal of an application that is associated with an extension is loaded. For instance, the portal may have extensibility points to enhance its functionality in a secure manner. The extension includes metadata and implementation code. The metadata is loaded. In response to the portal being loaded, the implementation code may not be loaded until a user interaction occurs.

20 Claims, 8 Drawing Sheets

(56) References Cited

OTHER PUBLICATIONS

O'Brien, Duane, "Create your own browser extensions, Part 1: Extend your reach into Chrome", Published on: Aug. 21, 2012, 20 pages, Available at: http://www.ibm.com/developerworks/library/os-extendchrome/.
"Extension—Building", Published on: May 24, 2015, 25 pages, Available at: https://developer.chrome.com/native-client/devguide/devcycle/building.

* cited by examiner

VIRTUALIZING EXTENSION CODE IN AN APPLICATION

CROSS-REFERENCE TO RELATED APPLICATION(S)

This application claims the benefit of U.S. Provisional Application No. 62/191,446, filed Jul. 12, 2015 and entitled "Virtualizing Third Party Extension Code in a Browser," the entirety of which is incorporated by reference herein.

BACKGROUND

An extensibility model allows an application to enhance its functionality through extension code running in the application while providing a stable environment by sandboxing code that runs in each extension. For instance, in a web application, functionality of an application may be enhanced by running extension code in an iframe. When an extension is running in an application, the extension consumes resources (e.g., processing cycles, memory, network, etc.). When many extensions are bootstrapped and running, the resulting consumption of resources may degrade an experience of a user of the application. For instance, running a substantial number of extensions may reduce an operating efficiency and/or a reliability of the application and/or a computing device on which the extensions run.

SUMMARY

Various approaches are described herein for, among other things, virtualizing extension code (e.g., third-party extension code) in an application (e.g., a web application in a browser). In an example approach, a portal of an application that is associated with an extension is loaded. For instance, the portal may have extensibility points to enhance its functionality in a secure manner. The extension includes metadata and implementation code. The metadata is loaded. In response to the portal being loaded, the implementation code may not be loaded until a user interaction occurs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
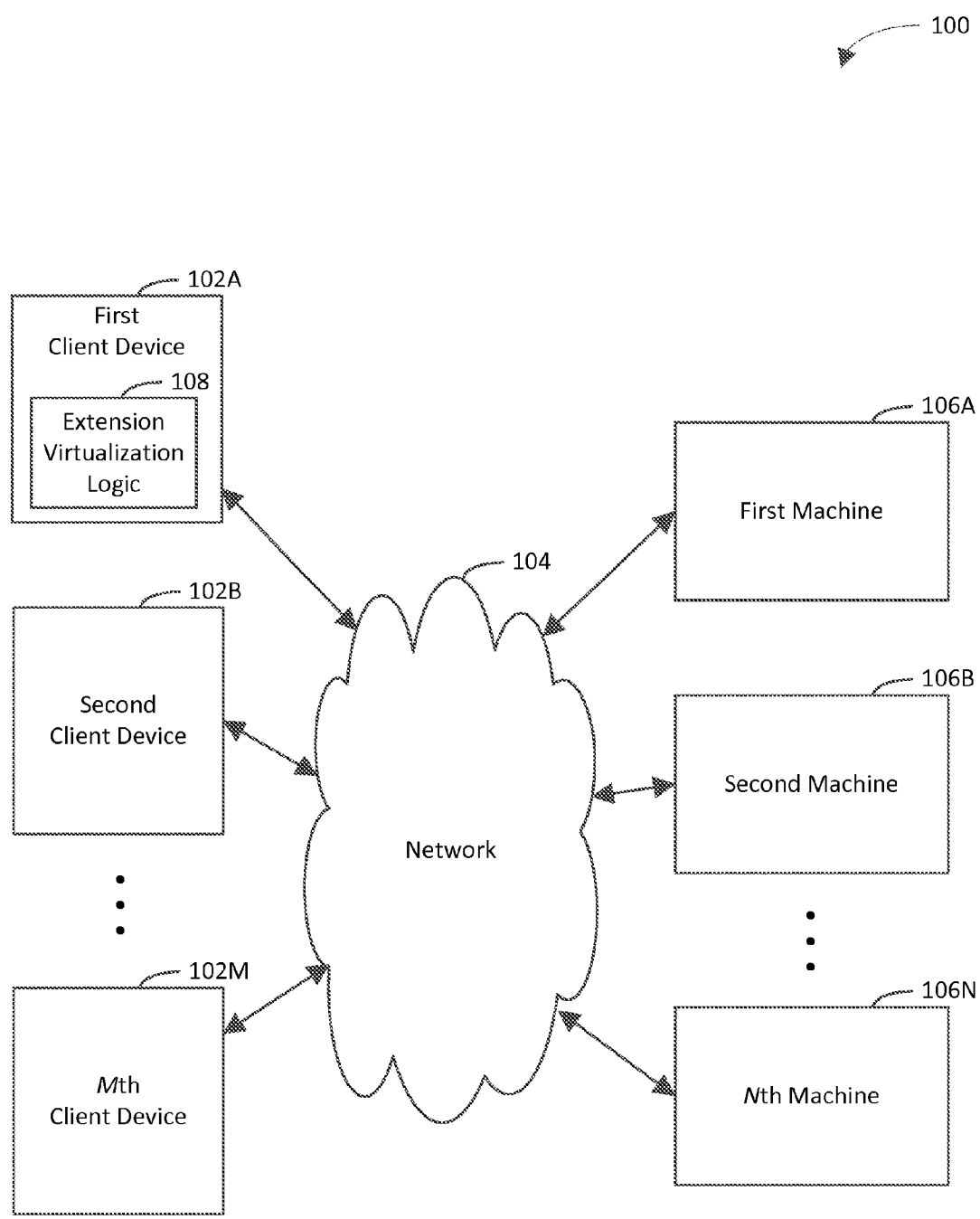
FIG. 1 is a block diagram of an example extension virtualization system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of virtualizing extension code (e.g., third-party extension code) in an application (e.g., a web application in a browser). For instance, a portal of an application that is associated with an extension is loaded. For instance, the portal may have extensibility points to enhance its functionality in a secure manner. The extension includes metadata and implementation code. The metadata may identify (e.g., describe) a user interface element that indicates an asset that is accessible via the application. Examples of an asset include but are not limited to an application, a portion of an application, a database, a virtual machine, and a website. Anything that is capable of being managed by a tooling application may be an asset, though the example embodiments are not limited in this respect. It should be noted that each extension may correspond to a single asset or multiple assets. For instance, an extension developer may develop an extension that covers websites and databases collectively. The implementation code is configured to implement (e.g., provide access to) functionality of the asset. Examples of a functionality of an asset include but are not limited to opening a screen for creating the asset and opening a screen for monitoring the asset. The metadata is loaded. In response to the portal being loaded, the implementation code may not be loaded until a user interaction occurs (e.g., until the user interacts with a user interface element that is identified by the metadata).

Example techniques described herein have a variety of benefits as compared to conventional techniques for using extension code in an application. For instance, the example techniques may increase an operating efficiency and/or a reliability of the application and/or a computing device on which the extension code runs. The example techniques may consume fewer resources (e.g., memory, processor cycles) than the conventional techniques. For instance, by loading manifests provided by extensions (and not implementation code of the extensions) at startup time of a portal of the application, less memory and/or fewer processor cycles may be consumed.

The implementation code that is provided by each extension may be loaded on an as-needed basis. The example techniques may not run implementation code of an extension until a user interaction indicates that the implementation code needs to run. The experience of a user (i.e., user experience) may be driven by the manifest that is provided by the extension until such user interaction occurs. The example techniques may be capable of automatically generating manifests for respective extensions. The manifests include metadata that is sufficient to generate user interface elements that indicate assets that are accessible via the application without including the corresponding implementation code for implementing the functionality of the assets.

By fetching a manifest from an extension without fetching the corresponding implementation code from the extension, the portal can enable a user experience without having to necessarily run the implementation code, which may ensure that the assets required to run the portal are limited to functionality that the user currently requires. For example, if the user were to select (e.g., click on) one particular asset type, the portal may load only the corresponding extension and interact with the extension to display the list of assets of the particular asset type in the portal.

Accordingly, when a portal loads, the portal need not necessarily load all extensions. Rather, the portal may contact each extension merely to obtain its manifest, and the portal may then shut down the extension. The portal at any point in time may run only those extensions that are actively driving the user interface (UI) currently being used by the user. All other extensions may be unloaded without degrading the user experience by driving portal UI using the corresponding manifests. An extension is said to be loaded if and only if the implementation code in the extension is loaded. An extension is said to be unloaded if and only if the implementation code in the extension is unloaded.

FIG. 1 is a block diagram of an example extension virtualization system 100 in accordance with an embodiment. Generally speaking, extension virtualization system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, extension virtualization system 100 virtualizes extension code (e.g., third-party extension code) in an application (e.g., a web application in a browser). Detail regarding techniques for virtualizing extension code is provided in the following discussion.

As shown in FIG. 1, extension virtualization system 100 includes a plurality of client devices 102A-102M, a network 104, and a plurality of machines 106A-106N. Communication among client devices 102A-102M and machines 106A-106N is carried out over network 104 using well-known network communication protocols. Network 104 may be a wide-area network (e.g., the Internet), a local area network (LAN), another type of network, or a combination thereof.

Client devices 102A-102M are processing systems that are capable of communicating with machines 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests to machines 106A-106N for requesting information stored on (or otherwise accessible via) machines 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by servers 104A-104N, so that client devices 102A-102M may access information that is available via the domains. Such domains may include Web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more machines 106A-106N.

First client device 102A is shown to include extension virtualization logic 108 for illustrative purposes. Extension virtualization logic 108 is configured to virtualize extension code (e.g., third-party extension code) in an application (e.g., a web application in a browser). Extension virtualization logic 108 or any portion thereof may be implemented as (or incorporated into) a shell, though the example embodiments are not limited in this respect. A shell is a user interface that is configured to access services of an operating system. For instance, the shell may use a command-line interface (CLI) or a graphical user interface (GUI) to provide access to the services of the operating system to a user of first client device 102A.

Extension virtualization logic 108 is configured to load a portal of an application that is associated with extension(s). Upon loading of the portal, the portal or a portion thereof may be deemed to be included in (e.g., to be a part of) extension virtualization logic 108, though the scope of the example embodiments is not limited in this respect. To provide virtualization capabilities in the portal, extension virtualization logic 108 may segregate each extension that is known by the portal into distinct parts (e.g., two distinct parts), including a manifest and implementation code. The manifest in each extension includes metadata that may describe a user experience and functionality (e.g., capabilities) provided by the extension (e.g., hubs in a jump bar and tiles on a startboard of the application). A jump bar of an application is a portion of a screen that includes hubs of the application. A hub of an application is a portion of a jump bar that includes interface element(s) that indicate an asset that is accessible via the application. A startboard of an application is a start screen of the application. The start screen is a screen that is provided to a user of the application at startup time of the application. The metadata may include no behavior (e.g., view models). In an example implementation, the manifest is a document. For instance, the manifest may be a JavaScript Object Notation (JSON) document. Extension virtualization logic 108 may provide the metadata to a runtime of the portal.

The metadata in each extension may contain enough information to drive general portal chrome without the need of loading the extension. The metadata may include any suitable information. For example, the metadata may include basic extension information, including but not limited to a name of the extension, a version of the extension, and a version of a software development kit (SDK) against which the extension was built. In another example, the metadata may include a list of tiles that the extension provides that can be displayed by default on the portal startboard. In yet another example, the metadata may include a list of hubs that the extension provides that can be displayed on the jumpbar of the portal. In still another example, the metadata may describe various types of assets that the extension provides. In accordance with this example, the metadata may include information regarding how to browse instances of each of the types of assets and/or information regarding the types of user experience (UX) components (e.g., blades and tiles) that can be used to display the assets. An example of a blade is a screen. An asset is an entity (e.g., a website or a virtual machine) to which the user of the portal has access. For instance, the asset may be an entity that the user of the portal has created. In yet another example, the metadata may include information regarding a capability, such as opening a screen to show a notification. For instance, the notification may be configured to prompt a user to take an action or to consider taking an action. The notification may inform the user of an event that has occurred or that is anticipated to occur. In still another example, the metadata may include user experience (UX) components, such as blades or tiles that the extension provides for rendering a user experience in the portal.

Extension virtualization logic 108 may load the manifests in a shell iframe (e.g., an iframe of a shell in which extension virtualization logic 108 is implemented). An iframe enables a visual hypertext markup language (HTML) window to be split into segments. Each segment of the iframe may show different content. Accordingly, each segment may correspond to a respective manifest. Extension virtualization logic 108 may keep the manifests loaded in the shell iframe. Extension virtualization logic 108 may load a first set of manifests when the portal of the application is initialized (e.g., to drive the relevant shell user interface (UI)). For instance, extension virtualization logic 108 may load the manifests in response to a first click-stop for the extension virtualization feature, rather than loading all the extensions when the portal is initialized. Extension virtualization logic 108 may load each manifest on demand.

Each manifest may be relatively small in size, as compared to a size of its corresponding implementation code, which may be beneficial, for example, if all of the in memory is kept in the shell iframe. Each manifest may include part or all of a definition for an asset, information to drive a "Browse" hub (e.g., to show in a list), information to enable notifications without needing to load the corresponding implementation code, information for a gallery of tiles, and a uniform resource identifier (URI) of the implementation code. For example, a URI may be a uniform resource locator (URL) or a uniform resource name (URN). The metadata associated with a feed may be requested by using a well-known convention in the URI, though the scope of the example embodiments is not limited in this respect. For instance, http://myextension may be the URI for the implementation code of an extension, and http://myextension/manifest or http://myextension?manifest may be the URI for the manifest of the extension. The manifest may include enough information to show an asset name in a list in a hub (e.g., a "Browse" hub), but once the list is clicked the corresponding implementation code may be loaded. Hubs, including a "Browse" hub, are discussed in further detail below with reference to FIGS. 2-4.

The implementation code in each extension includes artifacts that bootstrap the extension and allow the extension virtualization logic 108 to run code (e.g., the implementation code) provided by the extension in a sandboxed manner. Accordingly, the extension virtualization logic 108 may execute the code provided by the extension in a restricted operating system environment, for example, to control resources that the code may utilize during execution. Extension virtualization logic 108 may execute the implementation code that is included in an extension to provide the user experience and functionality that is described by the metadata in the extension.

By segregating each extension as described above, extension virtualization logic 108 virtualizes the extension so that the implementation code therein need not necessarily run until some user action requires the implementation code to run. Until such user action occurs, the user experience is driven by the manifest provided by the extension. Extension virtualization logic 108 may include a compiler that detects the functionality and experiences provided by one or more (e.g., all) of the extensions that are associated with an application and automatically generates the manifest(s) for those extension(s).

The extension virtualization logic 108 may use the metadata provided in the manifests for enabling various user experiences in the portal, such as displaying interface elements (e.g., icons) that can be selected to open hubs, notifications, and/or lists of asset types provided by the extensions.

The metadata provided by the manifests may identify (e.g., describe) user interface elements, which indicate assets that are accessible via the application. Instances of implementation code, which correspond to the respective manifests, may be configured to implement (e.g., provide access to) functionality of the assets. When the portal is loaded, extension virtualization logic 108 may load the metadata and may delay loading the implementation code until a user interaction occurs (e.g., until a user interacts with a user interface element that is identified by the metadata). Example techniques for virtualizing extension code are discussed in greater detail below with reference to FIGS. 2-8.

Machines 106A-106N are processing systems that are capable of communicating with client devices 102A-102M. Machines 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, machines 106A-106N are configured to host respective Web sites, so that the Web sites are accessible to users of extension virtualization system 100.

Extension virtualization logic 108 is shown to be incorporated in device 102A for illustrative purposes and is not intended to be limiting. It will be recognized that at least a portion (e.g., all) of extension virtualization logic 108 may be external to first client device 102A. For example, at least a portion of extension virtualization logic 108 may be incorporated in any one or more of the machines 106A-106N. In accordance with this example, client-side aspects of extension virtualization logic 108 may be incorporated in client device 102A, and server-side aspects of extension virtualization logic 108 may be incorporated in one or more of the machines 106A-106N. Extension virtualization logic 108 may be incorporated in a tooling application, though the scope of the example embodiments is not limited in this respect. A tooling application is an application that is capable of being used to perform diagnostic operations (e.g., identifying source of problem, debugging, profiling, controlling, etc.) with respect to resource(s). Examples of a tooling application include but are not limited to a web development program (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.).

Extension virtualization logic 108 may be implemented in various ways to virtualize extension code, including being implemented in hardware, software, firmware, or any combination thereof. For example, extension virtualization logic 108 may be implemented as computer program code configured to be executed in one or more processors. In another example, extension virtualization logic 108 may be implemented as hardware logic/electrical circuitry. For instance, extension virtualization logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

It will be recognized that any one or more of client devices 102A-102M and/or any one or more of machines 106A-106N may be implemented as a virtual machine, though the scope of the example embodiments is not limited in this respect.

Some benefits of the example embodiments will now be described in greater detail. Extensions may enable partners of an entity that provides the application and horizontal services (e.g., hubs) to project their domain logic into the portal of the application. Iframes may act as isolation boundaries between the extensions. Traditionally, all extensions that are associated with the application are loaded at startup time of the portal. Iframes are a limited resource, and a maximum number of iframes that may be loaded for an application (a.k.a. an iframe cap) depends on attributes of the application. The example embodiments may be capable of removing the need to have all extensions loaded at the same time in order to be able to load and/or use the portal. The number of extensions may not be limited by the iframe cap for the application, which may enable more partners to project their domain logic into the portal. Because not all extensions will need to be loaded (and hence fewer extensions may be in memory at a given point in time), the example embodiments may contribute to reducing the memory footprint of the portal.

The example embodiments may decrease resource usage in the portal of the application. For instance, the example embodiments may lower the memory footprint of a system by not needing to have all the extensions that are associated with the application loaded. The example embodiments may be capable of loading and unloading extensions. The example embodiments may be capable of loading extensions on demand after the portal has been loaded. The example embodiments may be capable of loading multiple extensions beyond the iframe cap for the application. The example embodiments may be capable of handling a relatively complex blade (e.g., a startboard of the application).

Figure 2:
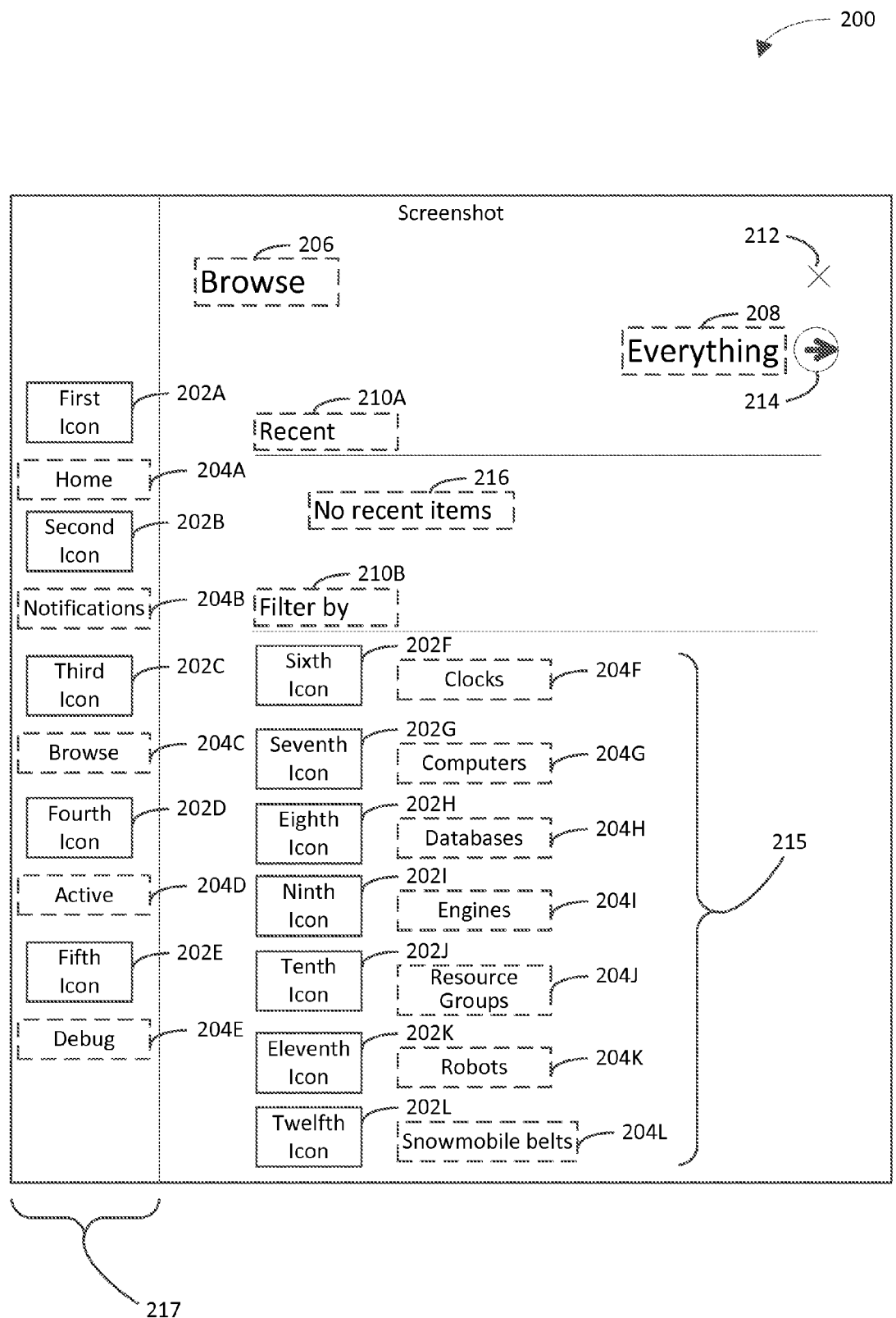
FIGS. 2-4 are example screenshots of an application in accordance with embodiments.

FIG. 2 is an example screenshot 200 of an application in accordance with an embodiment. Screenshot 200 includes interface elements 202A-202L, 204A-204L, 206, 208, 210A-210B, 212, 214, and 216, which are driven by manifests of extensions and therefore do not require implementation code of the extensions to be loaded or running. Interface elements 202A-202L, 212, and 214 are shown to be icons for illustrative purposes. Interface elements 204A-204L, 206, 208, 210A-210B, and 216 are shown to be text for illustrative purposes. Interface elements 202A-202L, 204A-204L, 208, 212, and 214 are implemented as virtual buttons for illustrative purposes. A virtual button is an interface element for which selection of the interface element causes implementation of functionality associated with the interface element to be performed. It will be recognized that each of the interface elements shown in FIG. 2 may be any suitable kind of interface element.

The manifests declare a variety of types, each of which is represented by a respective icon and respective text. For instance, interface elements 202A and 204A, which are shown to be an icon and text respectively, represent a "Home" type and are referred to collectively as a "Home" hub; interface elements 202B and 204B represent a "Notification" type and are referred to collectively as a "Notification" hub; interface elements 202C and 204C represent a "Browse" type and are referred to collectively as a "Browse" hub; interface elements 202D and 204D represent an "Active" type and are referred to collectively as an "Active" hub; and interface elements 202E and 204E represent a "Debug" type and are referred to collectively as a "Debug" hub. A hub of an application is a portion of a jump bar that includes interface element(s) that indicate an asset that is accessible via the application. For instance, the interface element(s) of the hub may be selectable to access a common screen. The various hubs mentioned above are included in a jump bar 217. A jump bar is a portion of a screen that includes a collection of hubs.

Selection of the "Home" type via selection of interface element 202A or 204A causes a "Home" screen to be displayed; selection of the "Notification" type via selection of interface element 202B or 204B causes a "Notification" screen to be displayed, and so on. Interface element 206 indicates that the "Browse" type has been selected, resulting in a "Browse" screen being displayed. For instance, the user may have selected (e.g., clicked on) interface element 202C or 204C, representing the "Browse" type, to cause the "Browse" screen to be displayed.

Interface elements 210A-210B are textual headings that correspond to respective categories of information. Interface element 210A recites "Recent" and identifies items (e.g., types) that have been browsed recently (e.g., within a specified period of time prior to a current time instance). As indicated by interface element 216, no recent items have been browsed. Interface element 21B recites "Filter by" and identifies types (e.g., assets) with respect to which a browse operation may be performed. Interface element 202F or 204F may be selected to perform a browse operation with regard to a "Clocks" type; interface element 202G or 204G may be selected to perform a browse operation with regard to a "Computers" type; interface element 202H or 204H may be selected to perform a browse operation with regard to a "Databases" type; interface element 202I or 204I may be selected to perform a browse operation with regard to an "Engines" type; interface element 202J or 204J may be selected to perform a browse operation with regard to a "Resource Groups" type; interface element 202K or 204K may be selected to perform a browse operation with regard to a "Robots" type; and interface element 202L or 204L may be selected to perform a browse operation with regard to a "Snowmobile belts" type.

In an example implementation, extension virtualization logic (e.g., extension virtualization logic 108) determines the types with respect to which the browse operation may be performed in response to the "Browse" type being selected. For instance, the extension virtualization logic may determine the types based on the types being identified by the manifests. The extension virtualization logic or a portion thereof may be incorporated into a shell, though the scope of the example embodiments is not limited in this respect.

The extension virtualization logic may review the manifest in the extension associated with the "Clocks" type to determine whether a corresponding clock is browsable. The manifest may indicate that the clock is browsable. Based on this indication, the extension virtualization logic may include the interface elements 202F and 204F in the list 215 of interface elements beneath the "Filter by" heading of interface element 210B (a.k.a. the browse list). If the user chooses to click interface element 202F or 204F, the extension virtualization logic knows which extension to load based on the manifest indicating that the extension is to be loaded when the user clicks on interface element 202F or 204F. For instance, when the user clicks on interface element 202F or 204F, the extension virtualization logic may review the manifest to determine which blade (i.e., screen) to open and from which extension. The extension virtualization logic can put a container on the screen (e.g., a visual container that represents the screen), and the extension virtualization logic can then delegate all of the UI renderings to that extension. In an example embodiment, the extension virtualization logic is configured to load an extension only in response to the user interacting with the browse list 215 and opening a new screen (e.g., by clicking on any of interface elements 202F-202L and 204F-204L). The loading of the extension may be delayed until the user actually requests that UI.

To render the browse list 215 in FIG. 2, the extension virtualization logic just needs the manifests from the extensions. The extension virtualization logic does not need to load any of the implementation code provided by those extensions. Thus, if the browse list 215 happened to be a thousand items long, for example, the shell would load a thousand manifests, which are relatively small as compared to their corresponding implementation code. Moreover, the manifests may have a fixed size.

For example, the manifest associated with the "Databases" type may indicate the existence of an asset that is called "Databases." The manifest may inform the extension virtualization logic of this when the portal is loaded. The manifest may provide no additional information regarding the extension associated with the "Databases" type when the portal is loaded, though the example embodiments is not limited in this respect. At the time that the portal is loaded, the extension virtualization logic does not need to know about the databases, how the extension works, and/or what kinds of things the extension projects. The extension virtualization logic merely needs to have an identification (e.g., description) of the asset if the user clicks on the interface element 202H or 204H on the "Browse" screen shown in FIG. 2.

Interface element 208 or 214 may be selected to perform a browse operation with regard to all types (e.g., without limiting the browse operation to a particular type). Interface element 212 may be selected to cause display of the "Browse" screen to be discontinued.

Figure 3:
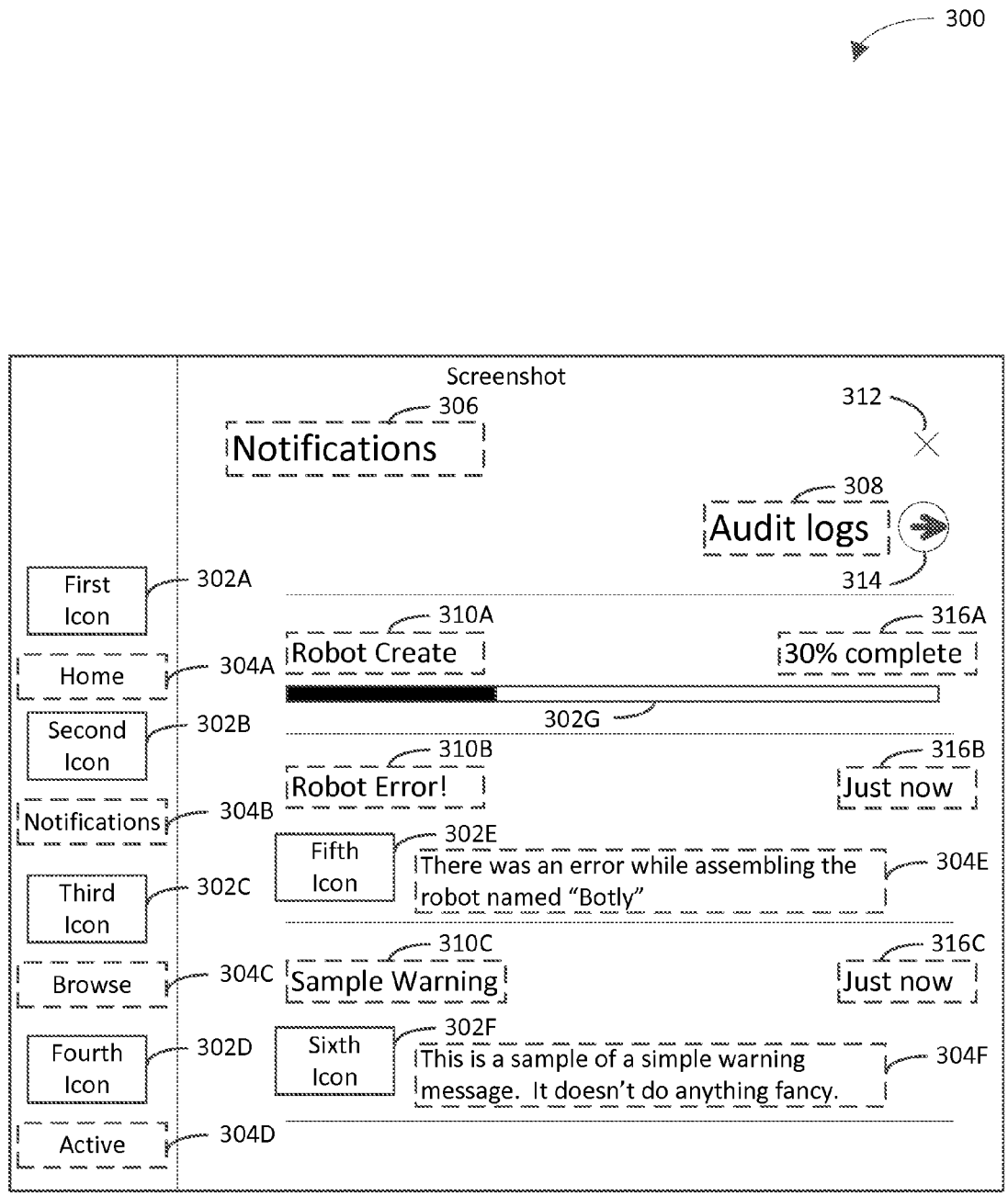

FIG. 3 is another example screenshot 300 of an application in accordance with an embodiment. Screenshot 300 includes interface elements 302A-302G, 304A-304F, 306, 308, 310A-310C, 312, 314, and 316A-316C, which are driven by manifests of extensions and therefore do not require implementation code of the extensions to be loaded or running. Interface elements 302A-302G, 312, and 314 are shown to be icons for illustrative purposes. Interface elements 304A-304F, 306, 308, 310A-310C, and 316A-316C are shown to be text for illustrative purposes. Interface elements 302A-302D, 304A-304D, 308, 312, and 314 are implemented as virtual buttons for illustrative purposes.

Interface elements 302A and 304A represent the "Home" type; interface elements 302B and 304B represent the "Notification" type; interface elements 302C and 304C represent the "Browse" type; and interface elements 302D and 304D represent the "Active" type. Interface element 306 indicates that the "Notification" type has been selected, resulting in a "Notification" screen being displayed. For instance, the user may have selected (e.g., clicked on) interface element 302B or 304B to cause the "Notification" screen to be displayed.

Interface elements 310A-310C are textual headings that correspond to respective notifications. Interface element 310A recites "Robot Create" and indicates that a robot is to be created. Interface element 316A recites "30% complete" and indicates that creation of the robot is 30% completed. Interface element 302B depicts a progress meter, 30% of which is shaded to illustrate that creation of the robot is 30% completed.

Interface element 310B recites "Robot Error!" and indicates that an error has occurred with regard to a robot. Interface element 316B recites "Just now" to indicate that the error has occurred very recently (e.g., within a designated time period prior to the current time). Interface element 302E is an icon associated with the error. Interface element 304E provides information about the error. For instance, interface element 304E recites that "There was an error while assembling the robot named 'Botly'."

Interface element 310C recites "Sample Warning" and indicates that a warning has been issued. Interface element 316C recites "Just now" to indicate that the warning has been issued very recently. Interface element 302F is an icon associated with the warning. Interface element 304F provides information about the warning. For instance, interface element 304F recites that "This is a sample of a simple warning message. It doesn't do anything fancy."

In one example, the interface elements that correspond to each notification may be provided by a respective manifest of a respective extension. In another example, the interface elements that correspond to the notifications may be provided by a common manifest of a single extension. Providing the interface elements by manifest(s), as described with regard to the foregoing examples, may eliminate a need for implementation code in the extension(s) to be running to display the notifications.

Interface element 308 or 314 may be selected to perform an audit of logs that are configured to track events for which notifications are to be generated. For instance, the "Notifications" screen may be updated to reflect a revised listing of notifications based on the results of the audit. It will be recognized that updating the "Notifications" screen to reflect the revised listing of notifications may be driven by manifests of extensions without requiring implementation code of the extensions to be loaded or running. Interface element 312 may be selected to cause display of the "Notifications" screen to be discontinued.

Figure 4:
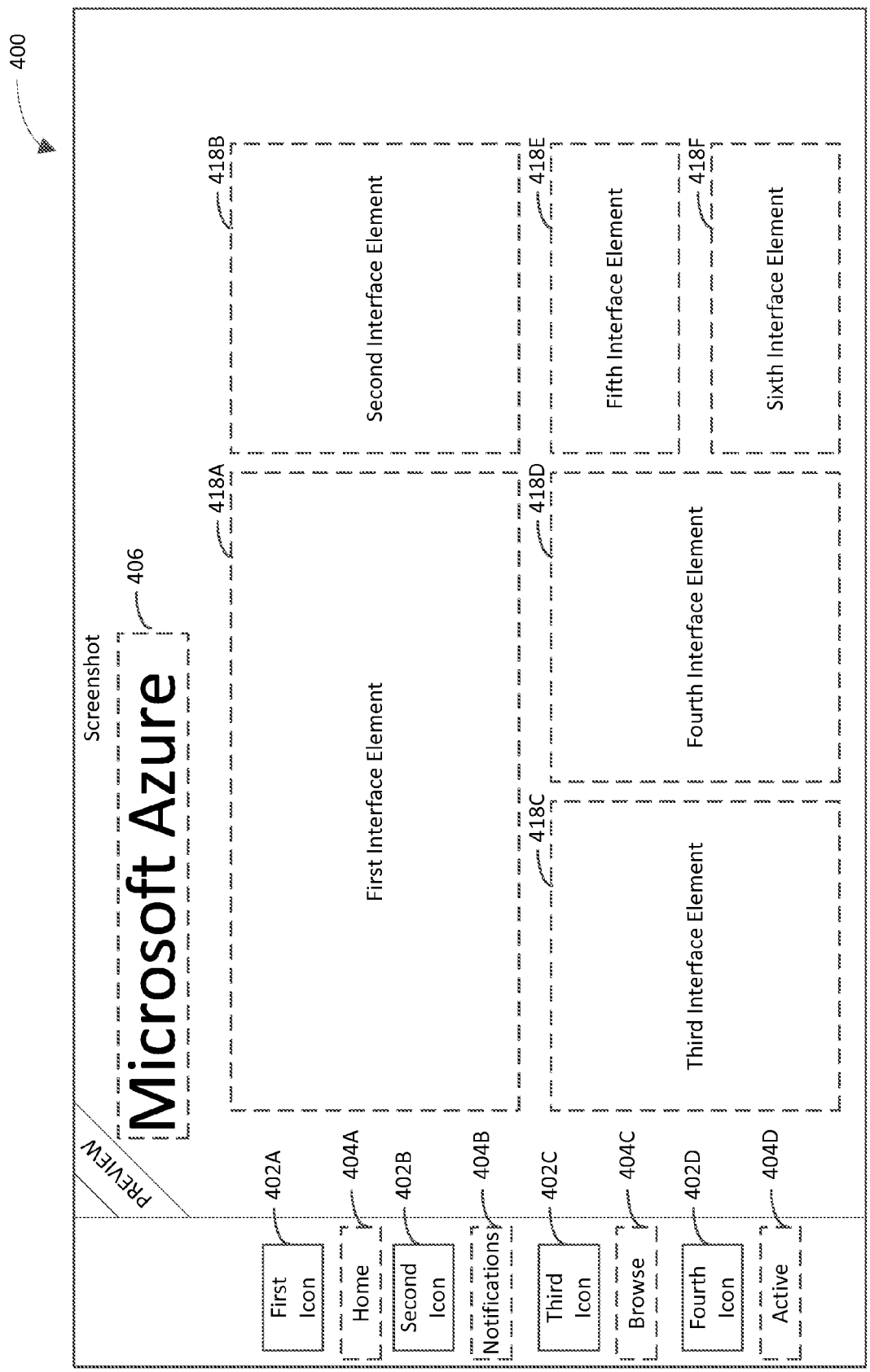

FIG. 4 is another example screenshot 400 of an application in accordance with an embodiment. Screenshot 400 includes interface elements 402A-402D, 404A-404D, 406, and 418A-418F, which are driven by manifests of extensions and therefore do not require implementation code of the extensions to be loaded or running. Interface element 406 recites "Microsoft Azure" to indicate that screenshot 400 represents a startboard for an Azure® cloud computing platform, which is developed and distributed by Microsoft Corporation.

Interface elements 418A-418F are shown in FIG. 4 to be respective tiles of the startboard. Information about the tiles in the manifests allows the extension virtualization logic (e.g., extension virtualization logic 108) to allocate startboard real estate to the tiles even before instances of implementation code associated with the respective tiles are loaded. For instance, the manifests may provide enough information to enable the extension virtualization logic to draw the shapes of the interface elements 418A-418F. Allocating the startboard real estate to the tiles in this manner may enable the user to start interacting with interface elements 418A-418F identified by the manifests, which load more quickly than their corresponding instances of implementation code, while letting the instances of implementation code load in the background if they are needed.

For instance, each instance of implementation code may be loaded if and only if the corresponding interface element is selected by a user. Thus, rather than having to start all of the extensions associated with the interface elements 418A-418F to get the data for presenting the interface elements 418A-418F, the extension virtualization logic may draw the interface elements 418A-418F as placeholders based on the manifests. The manifests may indicate what UI is to be placed in each of the interface elements 418A-418F. The extension virtualization logic may request that the extension put the UI on the screen. It will be recognized that a size of each of the interface elements 418A-418F may be same as or different from a size of any other(s) of the interface elements 418A-418F. The manifests may indicate how much space is to be allocated to each of the interface elements 418A-418F.

The example techniques described herein may be capable of unloading extensions when the extensions are not needed. For example, the extension virtualization logic may display a specified tile on the screen because the user navigated to the specified tile. In accordance with this example, when the user navigates away from the specified tile and/or the specified tile is no longer visible on the screen, the extension virtualization logic may unload the extension from the client (e.g., first client device 102A). For instance, the extension virtualization logic may unload the extension if the specified tile is the only tile for which the extension is developing UI. Unloading extensions in this manner may facilitate scaling the example techniques described herein.

The tiles may serve as a reference count on the extension. For example, when the sum total of tiles that are being projected by the extension goes down to zero, then the extension may be unloaded. In accordance with this example, the sum total reaching zero may trigger the extension virtualization logic to unload the extension. For instance, the visual pieces on the screen (i.e., the visual representations of the tiles on the screen) may serve as a reference count that keeps the extension loaded.

Figure 5:
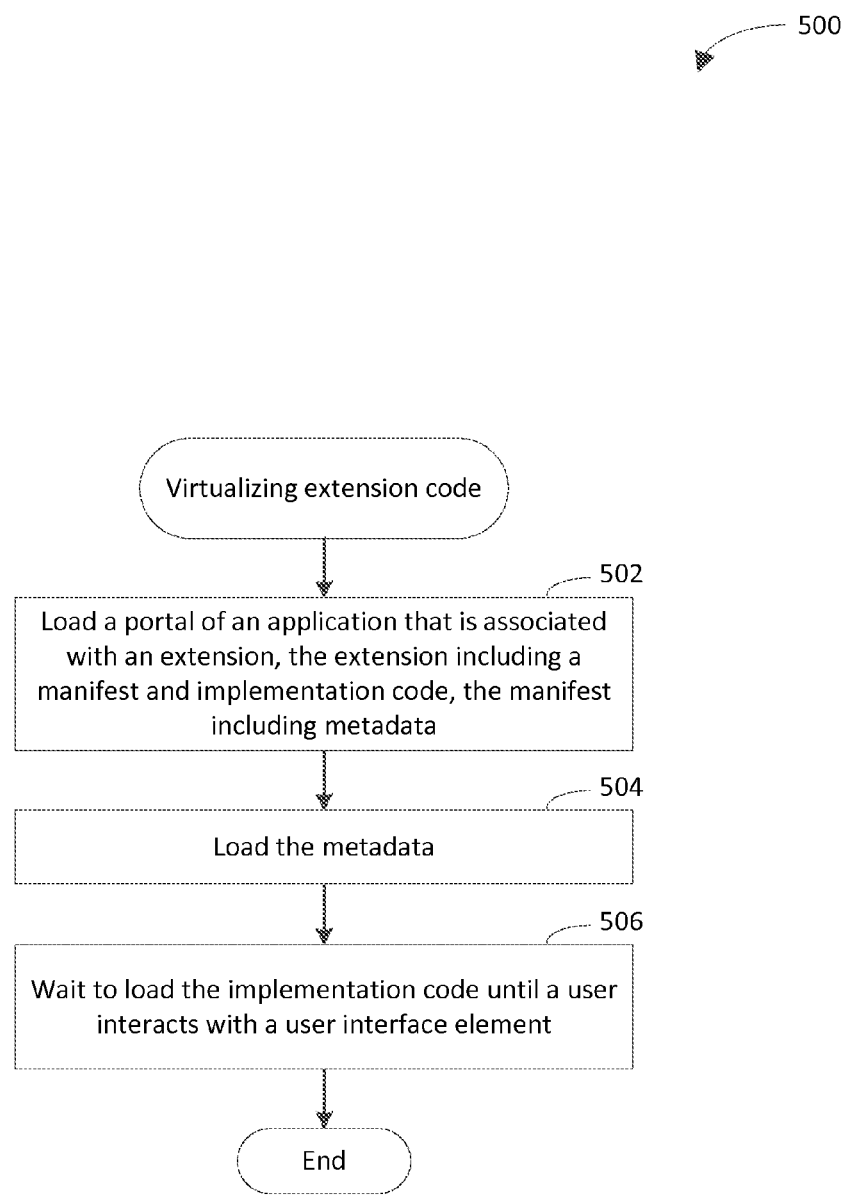
FIGS. 5-7 depict flowcharts of example methods for virtualizing extension code in accordance with embodiments.
Figure 6:
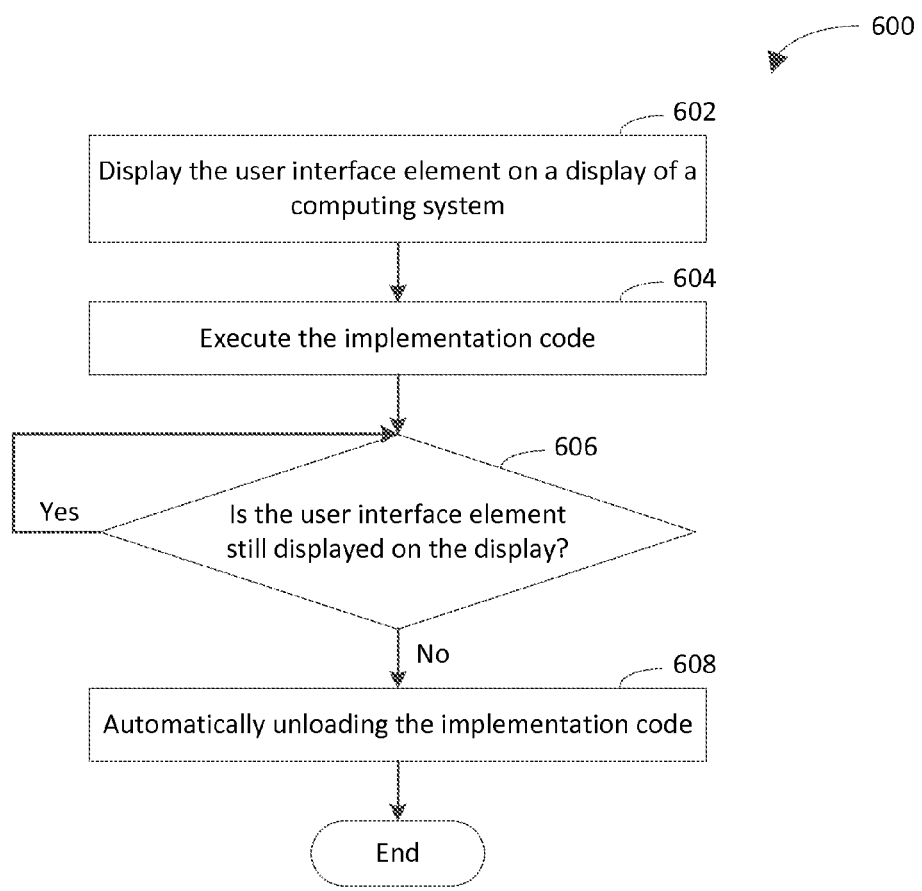
Figure 7:
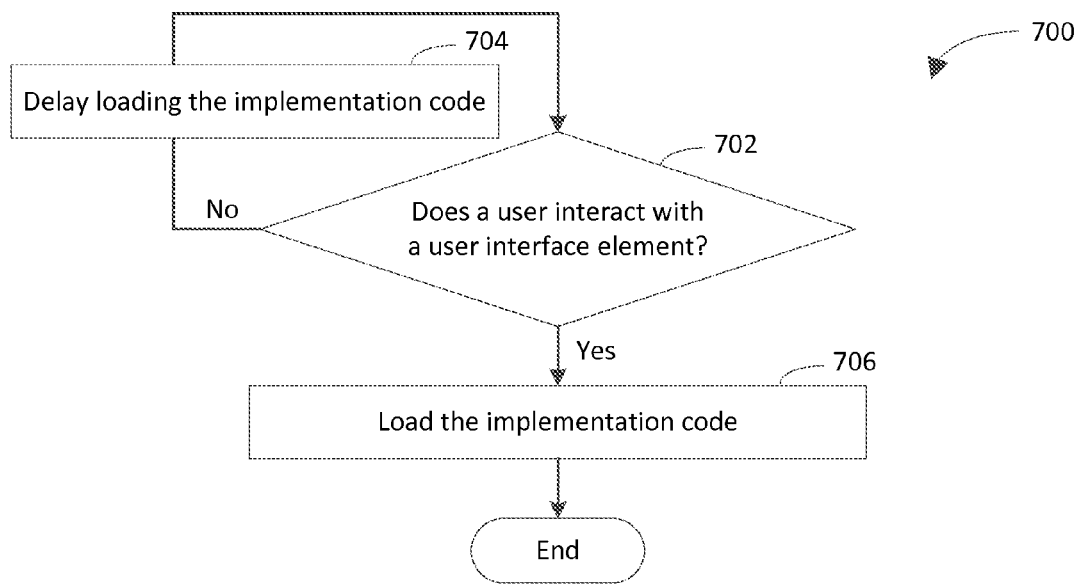
Figure 8:
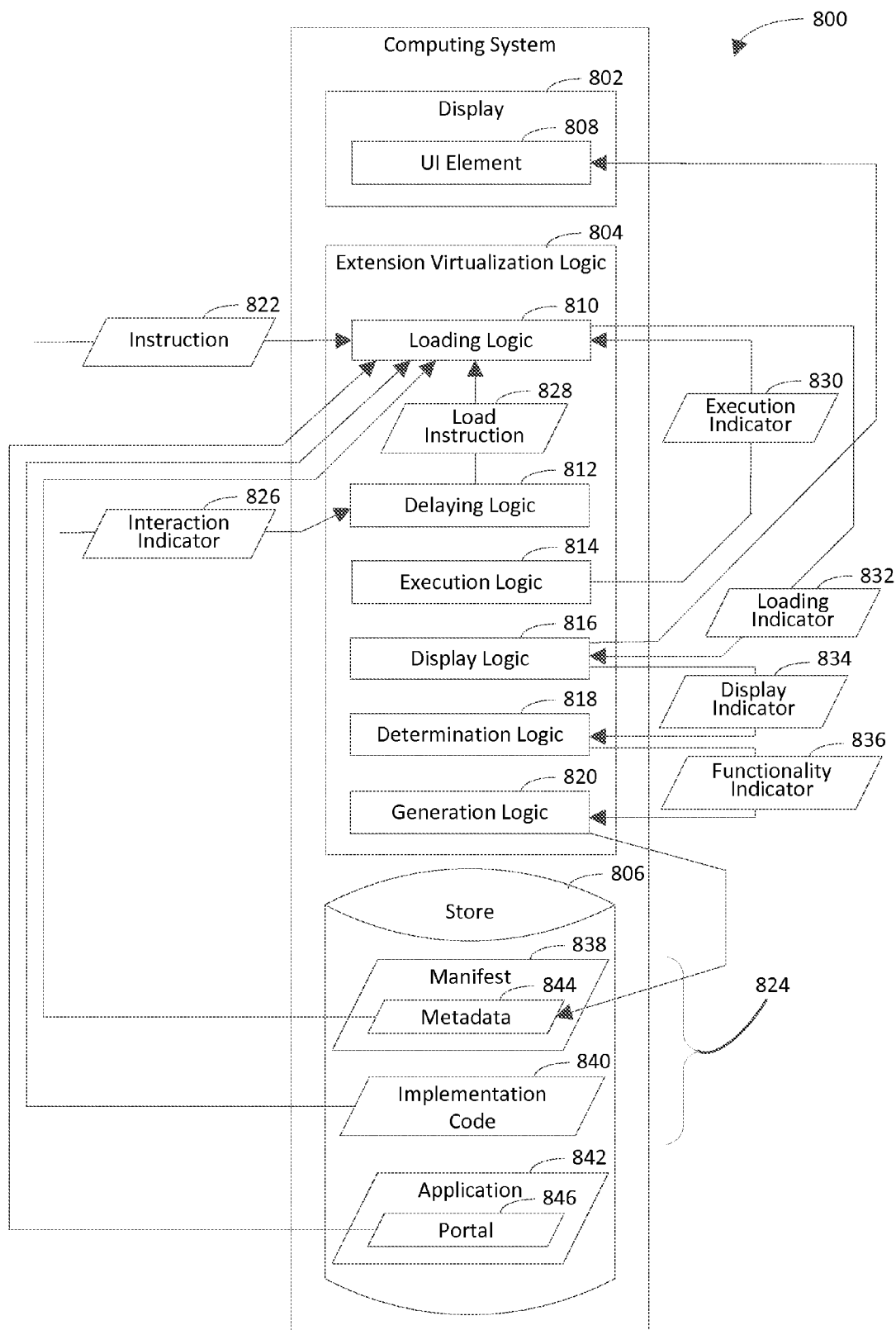
FIG. 8 is a block diagram of an example computing system shown in FIG. 1 in accordance with an embodiment.

FIGS. 5-7 depict flowcharts 500, 600, 700 of example methods for virtualizing extension code in accordance with embodiments. Flowcharts 500, 600, 700 may be performed by any one or more of client devices 102A-102M and/or any one or more of machines 106A-106N shown in FIG. 1, for example. For illustrative purposes, flowcharts 500, 600, 700 are described with respect to a computing system 800 shown in FIG. 8. As shown in FIG. 8, computing system 800 includes a display 802, extension virtualization logic 804, and a store 806. A user interface (UI) element 808 is displayed on display 802. Extension virtualization logic 804 includes loading logic 810, delaying logic 812, execution logic 814, display logic 816, determination logic 818, and generation logic 820. Further structural and operational embodiments will be apparent to persons skilled in the relevant art(s) based on the discussion regarding flowcharts 500, 600, 700.

As shown in FIG. 5, the method of flowchart 500 begins at step 502. In step 502, a portal of an application that is associated with an extension is loaded. The extension includes a manifest and implementation code. The manifest includes metadata that identifies (e.g., describes) a user interface element that indicates an asset that is accessible via the application. For example, the user interface element may be configured to provide a user experience with regard to the application. In another example, the user interface element may include (e.g., may be) a screen, text, an icon (e.g., a virtual button), etc. The asset may be an application, a portion of an application, a database, a website, or a virtual machine. The implementation code is configured to implement the user interface element. For example, the implementation code may be configured to provide functionality associated with the user interface element. In accordance with this example, the implementation code may be configured to implement the functionality in response to (e.g., based on) an interaction with (e.g., a selection of) the user interface element.

In an example implementation, loading logic 810 loads a portal 846 of an application 842 that is associated with an extension 824. For example, loading logic 810 may retrieve the portal 846 from store 806. In accordance with this example, loading logic 810 may load the portal 846 in response to receipt of an instruction 822. For instance, the instruction 822 may indicate that the portal 846 is to be loaded. The extension 824 includes a manifest 838 and implementation code 840. The manifest 838 includes metadata 844 that identifies a user interface (UI) element 808. The UI element 808 indicates the asset that is accessible via the application 842.

In an example embodiment, the metadata describes a hub in a jump bar that is defined by the application. For instance, the metadata may indicate (e.g., describe) an asset with which the hub is associated. The metadata may specify how many interface elements are to be included in the hub and/or attributes of those interface elements. Examples of an attribute of an interface element include but are not limited to a kind of the interface element (e.g., an icon, a widget, or text); a size, color, or opacity of the interface element; and a location of the interface element in the hub (e.g., an order of the interface element with regard to another interface element in the hub).

In another example embodiment, the metadata describes a tile on a start screen of the application. For instance, the metadata may describe a size of the tile (e.g., a number of pixels in an x-direction and/or a number of pixel in a y-direction); an asset with which the tile is to be associated; information (e.g., information regarding the asset) that is to be included in the tile; and a location of the tile on the start screen (e.g., an order of the tile with regard to other tiles on the start screen).

In yet another example embodiment, the metadata indicates that the extension is capable of providing (e.g., generating) a screen through which functionality of the extension is accessible. For example, the implementation code of the extension may be configured to provide the functionality. In accordance with this example, the metadata may indicate that the extension is capable of providing the screen through which execution of the implementation code may be initiated.

In still another example embodiment, the metadata indicates that the extension is capable of monitoring the asset. For example, the extension may be capable of continuously or periodically gathering data regarding the asset to determine whether a designated event occurs. In accordance with this example, the extension may be configured to analyze the data to determine whether the designated event occurs. The metadata may indicate a frequency with which respective portions of the data are to be gathered.

In another example embodiment, the metadata indicates that the extension is capable of showing a notification regarding the asset. For example, the metadata may specify a format for the notification. In accordance with this example, the metadata may specify text or an icon that is to be displayed in accordance with showing the notification. The notification may specify a source of a problem that affects (or that is anticipated to affect) the asset. The notification may include information to troubleshoot or solve the problem. In another example, the metadata may indicate a location at which the notification is to be displayed on a screen.

In yet another example embodiment, the metadata indicates that the extension supports creation of a website.

In still another example embodiment, the metadata indicates that the extension supports creation of a database.

In another example embodiment, the metadata includes information that enables a notification regarding the asset to be provided without the implementation code being loaded. For instance, the information may include a definition of the asset.

In yet another example embodiment, the metadata includes information pertaining to a gallery of tiles. For instance, the metadata may indicate (e.g., define) the tiles that are to be included in the gallery.

In still another example embodiment, the metadata includes a uniform resource identifier that identifies a location of the asset.

In another example embodiment, the implementation code is configured to bootstrap the extension.

At step 504, the metadata is loaded. For example, the metadata may be loaded in response to loading the portal. In another example, the metadata may be loaded in lieu of the implementation code. In yet another example, the metadata may be automatically loaded. In an example embodiment, loading the metadata includes causing the user interface element to be displayed on a display of the computing system (e.g., without the implementation code being loaded).

In an example implementation, loading logic 810 loads the metadata 844. For example, delaying logic 812 may provide a first loading instruction (e.g., loading instruction 828) to loading logic 810. The first loading instruction may instruct loading logic 810 to load the metadata 844. In accordance with this example, loading logic 810 may load the metadata 844 in response to (e.g., based on) receipt of the first loading instruction. In another example, loading logic 810 may cause the UI element 808 to be displayed on display 802. For instance, loading logic 810 may cause the UI element 808 to be displayed on display 802 without the implementation code 840 being loaded.

At step 506, waiting to load the implementation code is performed until a user interacts with the user interface element that is identified by the metadata. For instance, waiting to load the implementation code may be performed in response to loading the portal. The user may interact with the user interface element in any of a variety of ways, including but not limited to a touch command (e.g., click, double click, click and hold), a hover command (e.g., hover for at least a specified period of time), a voice command, and a gesture command (e.g., gaze, blink, hand-wave, point, head movement). Such an interaction with the user interface element may constitute selection of the user interface element. In an example implementation, display logic 816 displays the UI element 808 on display 802. For example, loading logic 810 may generate a loading indicator 832, which may indicate that the metadata 844 is loaded. In accordance with this example, display logic 816 may display the UI element 808 on display 802 in response to receipt of the loading indicator 832.

In accordance with this implementation, delaying logic 812 causes loading logic 810 to wait to load the implementation code 840 until the user interacts with the UI element 808. For example, delaying logic 812 may provide a delay instruction to loading logic 810. The delay instruction may instruct loading logic 810 to not load the implementation code 840. In accordance with this implementation, delaying logic 812 may provide a second loading instruction to loading logic 810 in response to determining that the user interacts with the UI element 808. For instance, delaying logic 812 may provide the second loading instruction in response to receiving an interaction indicator 826. The second loading instruction indicates that the implementation code 840 is to be loaded. Accordingly, the second loading instruction may instruct loading logic 810 to load the implementation code 840. The interaction indicator 826 indicates that the user interacts with the UI element 808. In further accordance with this implementation, loading logic 810 may load the implementation code 840 in response to receipt of the second loading instruction. It will be recognized that delaying logic 812 need not necessarily provide the delay instruction. For instance, loading logic 810 may be configured to not load the implementation code 840 until loading logic 810 receives the second loading instruction.

In some example embodiments, one or more steps 502, 504, and/or 506 of flowchart 500 may not be performed. Moreover, steps in addition to or in lieu of steps 502, 504, and/or 506 may be performed. For instance, in an example embodiment, the method of flowchart 500 further includes loading the implementation code in response to the user interacting with the user interface element. For instance, loading logic 810 may load the implementation code 840 in response to the user interacting with the UI element 808. In accordance with this embodiment, the method of flowchart 500 further includes running the implementation code in a sandboxed manner. For instance, execution logic 814 may run the implementation code 840 in the sandboxed manner. It will be recognized that sandboxing the implementation code 840 may enable the implementation code to run without affecting (e.g., interacting with or interfering with) other code (e.g., the implementation code of other extensions).

In another example embodiment, the method of flowchart 500 further includes executing the implementation code. For instance, execution logic 814 may execute the implementation code 840. In accordance with this embodiment, the method of flowchart 500 further includes unloading the implementation code without unloading the metadata, in response to executing the implementation code. For instance, the implementation code may be automatically unloaded based on one or more criteria, including but not limited to execution of the implementation code completing. In an example, loading logic 810 may unload the implementation code 840 without unloading the metadata 844 (e.g., without unloading the manifest 838, which includes the metadata 844), in response to execution logic 814 executing the implementation code 840. In accordance with this example, execution logic 814 may generate an execution indictor 830 in response to executing the implementation code 840. The execution indicator 830 may indicate that the implementation code 840 has been executed. The execution indicator 830 may specify that the implementation code 840 is to be unloaded and/or that the metadata 844 is not to be unloaded, though the scope of the example embodiments is not limited in this respect. In further accordance with this example, loading logic 810 may unload the implementation code 840 without unloading the metadata 844 in response to receipt of the execution indicator 830.

In yet another example embodiment, the method of flowchart 500 further includes automatically determining a functionality provided by the extension. For instance, the extension may be analyzed to determine the functionality of the extension. In an example, determination logic 818 may automatically determine the functionality provided by the extension 824. In accordance with this example, determination logic 818 may generate a functionality indicator 836 in response to determining the functionality provided by the extension 824. The functionality indicator 836 may specify the functionality provided by the extension 824. In accordance with this embodiment, the method of flowchart 500 further includes automatically generating the metadata to indicate the functionality in response to automatically determining the functionality. For example, generation logic 820 may automatically generate the metadata 844 (e.g., automatically generate the manifest 838, which includes the metadata 844) to indicate the functionality. In accordance with this example, generation logic 820 may automatically generate the metadata 844 based on (e.g., based at least in part on) the functionality indicator 836. Determination logic 818 (or any portion thereof) and/or generation logic 802 (or any portion thereof) may be implemented as (or incorporated into) a compiler, though the example embodiments are not limited in this respect. Accordingly, automatically determining the functionality provided by the extension 824 and/or automatically generating the metadata 844 may be performed during a compiling operation that is performed on the extension.

In still another example embodiment, the method of flowchart 500 further includes one or more of the steps shown in flowchart 600 of FIG. 6. As shown in FIG. 6, the method of flowchart 600 begins at step 602. In step 602, the user interface element is displayed on a display of a computing system. In an example implementation, display logic 816 displays the UI element 808 on display 802 of computing system 800.

At step 604, the implementation code is executed. In an example implementation, execution logic 814 executes the implementation code 840.

At step 606, a determination is made whether the user interface element is still displayed on the display. If the user interface element is still displayed on the display, control returns to step 606. If the user interface element is no longer displayed on the display, control flows to step 608.

In an example implementation, determination logic 818 determines whether the UI element 808 is still displayed on display 802. For example, display logic 816 may generate a display indicator 834 that indicates whether the UI element 808 is displayed on display 802. In an aspect of this example, determination logic 818 may determine that the UI element 808 is still displayed on display 802 based on the display indicator 834 indicating that the UI element is displayed on display 802. In another aspect of this example, determination logic 818 may determine that the UI element 808 is no longer displayed on display 802 based on the display indicator 834 indicating that the UI element is not displayed on display 802.

At step 608, the implementation code is automatically unloaded. For example, the implementation code may be automatically unloaded in response to determining that the user interface element is no longer displayed on the display. The implementation code may be automatically unloaded further in response to determining that execution of the implementation code is complete. In an example implementation, loading logic 810 automatically unloads the implementation code 840.

In another example embodiment, that the steps shown in flowchart 700 of FIG. 7 may be performed in lieu of step 506 of FIG. 5. As shown in FIG. 7, the method of flowchart 700 begins at step 702. In step 702, a determination is made whether a user interacts with the user interface element that is identified by the metadata. For instance, determining whether a user interacts with the interface element may be performed in response to loading the portal and/or in response to loading the metadata. If a user interacts with the user interface element, control flows to step 706. Otherwise, control flows to step 704.

In an example implementation, delaying logic 812 determines whether a user interacts with the UI element 808. For example, delaying logic 812 may determine whether a user interacts with the UI element 808 based on the interaction indicator 826. In accordance with this example, delaying logic 812 may determine that a user interacts with the UI element 808 based on the interaction indicator 826 indicating that a user interacts with the UI element 808. In further accordance with this example, delaying logic 812 may determine that a user does not interact with the UI element 808 based on the interaction indicator 826 indicating that a user does not interact with the UI element 808.

At step 704, loading the implementation code is delayed. For instance, loading the implementation code may be delayed for a specified (e.g., predetermined) amount of time before flow returns to step 702. In an example implementation, delaying logic 812 delays loading the implementation code 840.

At step 706, the implementation code is loaded. In an example implementation, loading logic 810 loads the implementation code 840. For example, delaying logic 812 may generate the load instruction 828 in response to determining that a user interacts with the UI element 808 (e.g., in response to the interaction indicator 826 indicating that a user interacts with the UI element 808). In accordance with this example, the load instruction 828 may indicate that the implementation code is to be loaded. In further accordance with this example, loading logic 810 may load the implementation code 840 in response to receipt of the load instruction 828.

It will be recognized that computing system 800 may not include one or more of display 802, extension virtualization logic 804, store 806, loading logic 810, delaying logic 812, execution logic 814, display logic 816, determination logic 818, and/or generation logic 820. Furthermore, computing system 800 may include components in addition to or in lieu of display 802, extension virtualization logic 804, store 806, loading logic 810, delaying logic 812, execution logic 814, display logic 816, determination logic 818, and/or generation logic 820. It will be recognized that store 806 may be any suitable type of store. One type of store is a database. For instance, store 806 may be a relational database, an entity-relationship database, an object database, an object relational database, an extensible markup language (XML) database, etc.

Any one or more of extension virtualization logic 108, extension virtualization logic 804, loading logic 810, delaying logic 812, execution logic 814, display logic 816, determination logic 818, generation logic 820, flowchart 500, flowchart 600, and/or flowchart 700 may be implemented in hardware, software, firmware, or any combination thereof.

For example, any one or more of extension virtualization logic 108, extension virtualization logic 804, loading logic 810, delaying logic 812, execution logic 814, display logic 816, determination logic 818, generation logic 820, flowchart 500, flowchart 600, and/or flowchart 700 may be implemented, at least in part, as computer program code configured to be executed in one or more processors.

In another example, any one or more of extension virtualization logic 108, extension virtualization logic 804, loading logic 810, delaying logic 812, execution logic 814, display logic 816, determination logic 818, generation logic 820, flowchart 500, flowchart 600, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Endpoint Driven Browse

One type of application with which extensions may be associated is a web browser. If the extensions already have asset projections and there is an asset projection for assets that are accessible via the application, instead of having the extensions provide a view model for browse, a model may be provided to enable the extensions to provide contents of browse via an endpoint in their asset projection.

For instance, the asset projection may include first and second endpoints for browse. The first endpoint, referred to as "Count," may be used in the "Browse" hub or in a collection tile. The second endpoint, referred to as "List of items," may be used to show the list of items. A technique may be developed to describe the schema (columns). If the asset projection has an open data protocol (OData) endpoint, the schema may be acquired by getting the conceptual schema definition language (CSDL) associated with the feed.

Some advantages of an endpoint driven browse may include but are not limited to reducing an amount of code that extensions need to provide; deferring further the need to load the extensions (e.g., all items may be browsed without loading the extensions); the implementation code in each extension may be loaded if and only if an asset blade (e.g., screen) is opened; browse may be always implemented using the correct patterns (e.g., data virtualization, data caches, user experience (UX), etc.); and the extensions may have a relatively smaller footprint.

Endpoint Driven Collection Tile

The discussion above with regard to endpoint driven browse is applicable to an endpoint driven collection tile that can be placed in the startboard.

Improving Polling/Enabling Complex Startboard and Blades

On a relatively large display, the startboard (or any blade) may include tiles from N extensions, where N is an integer. If N is greater than the number of iframes, the view models for each tile may be held in memory after the tile has been rendered just to poll for new data. Such a poll operation may not result in new data. For example, the poll operation may include polling for a list of websites. It will be recognized that such a list may change sporadically for most subscriptions, which may result in unnecessary consumption of memory and/or processor cycles.

In some example embodiments, after a tile has been rendered, new data for the tile may be obtained without a need to have implementation code of the extension loaded. Traditionally, all the tiles poll for new data, and all extensions are kept in memory. Table 1 below shows different types of tile and a technique that may be used for each corresponding scenario:

TABLE 1

Techniques for types of tile

| Type | Scenarios | Technique | Need extension in memory? |
|---|---|---|---|
| Static | Button, QuickStart, InfoList | Once rendered, it does not change | No |
| Low frequency update | List of websites, team project, properties page | Push change/ schedule polling | No |
| High frequency update | Monitoring, request alerts | Push change/ schedule polling | No |
| Interactive | Monaco | Extension needs to be in memory and needs to poll | Yes |

As shown in Table 1, for most of the scenarios, the extension does not need to be in memory to get new data. However, changes may take place to make this happen, some of which may be in the updatable tiles. The phrase "push change" refers to enabling a push infrastructure. The phrase "schedule polling" refers to enabling a polling queue in which closures may be registered to get the data (e.g., similar to a queue of continuations). Another approach may be to load the extensions in a round robin fashion, allow them to run an episode of execution, and then unload them. In an example implementation, an asynchronous module definition (AMD) story that is optimized to load first these closures (such that not all the UI of the extension is needed upfront) may be used.

Move from Iframes to Web Workers

Web workers may be used to host the implementation of the extensions.

Example Web Application Implementation

A web application may be extensible. For example, untrusted third-party extensions may be loaded to enhance the user experience associated with the application. In accordance with this example, third-party extensions may be loaded into and/or unloaded from the user experience.

Extensions (e.g., first-party extensions and/or third-party extensions) may be structured to include a manifest that gives the shell (code UI) enough information to be able to run on behalf of the extension without having to fully load the extension. That may provide greater productivity because less third-party code is loaded in order for the extensions to start working.

The extensions may be exclusively client-side code (i.e., rather than server-side code). For instance, the extensions may be used to scale a browser on a client device (e.g., any of client devices 102A-102M). There is only so much memory available for consumption in a browser. Traditionally, the amount of memory consumed by the extensions is substantial. Accordingly, it may be challenging to load more than 10 or 20 of the extensions. However, the example techniques described herein increase the number of extensions that may be used in conjunction with an application. For instance, the example techniques may enable 100 or 1000 or more extensions to be used in conjunction with an application. For some user experiences, it may be desirable to use 10 or 20 or 30 or more services working in concert in the same user experience.

One example portal to which the example techniques are applicable is Azure® Preview Portal, developed and distributed by Microsoft Corporation. Azure® Preview Portal operates like an operating system shell (e.g., in a browser), so that multiple tasks may run at the same time from various parties.

Some conventional techniques scale down what is meant by "extensions;" whereas, the example techniques described herein may support extensions that are capable of driving relatively rich (e.g., complex) UI. The conventional techniques may use extensions that do not scale (e.g., that can load only a few extensions until their user experience starts to degrade) and/or that can load many extensions that are not very rich (e.g., extensions that can project simple text boxes); whereas, the example techniques described herein may use many relatively rich extensions.

A manifest may not increase in size based on the size of the extension that includes the manifest. The manifest is not dependent on how complex the extension is. Accordingly, the manifests may be substantially the same size, though the scope of the example embodiments is not limited in this respect. The example techniques may be capable of using thousands of manifests.

Code from other first- and third-parties may determine what UI can be projected. For instance, if a structured query language (SQL) server wants to offer its services through the portal, the SQL server may utilize an extension to create screens.

The portal may have a shell that has some basic capabilities. The portal may facilitate projection of UIs. In Azure® Preview Portal, a user can buy a website, manage a database, manage many types of assets, etc. For each experience of an asset (e.g., a website or a database), the experience of the asset is owned by the theme of the asset. The theme may create an extension and project a substantial amount of UI in the shell. For instance, the SQL experience is owned by a SQL server team that creates another extension and can project a substantial amount of UI.

Assume that there is a third experience (e.g., a virtual machine), which is owned by another team. It is reasonable to think that each of those experiences may have a different size (e.g., in terms of the number of screens, number of charts, all the artifacts that are to be projected in the UI). Some of those experiences might be larger; some might be smaller. For the sake of discussion, assume that the website is relatively small, and the virtual machine is relatively large. The manifests are designed to scale. Accordingly, in the beginning, when the portal is loaded, a small amount of information (e.g., a file) that describes each of the extensions (e.g., implementation code in each extension) is provided. The existence of the extensions may be known, and the entire code of the extensions (e.g., the implementation code in the extensions) need not necessarily be loaded. The size of the information (i.e., the manifest) that is loaded for each extension is not a function of the size of the extension. Accordingly, an extension that is relatively large may not prevent other extensions from loading. The size of the manifest may be relatively small as compared to the size of the corresponding implementation code and may not scale with the size of the extension. Thus, a substantial number (e.g., hundreds or thousands) of manifests may be loaded. The entire code of the extension need not be retrieved before starting the portal. Rather, the full code for the experience may be retrieved if and only if the user engages with that experience.

If an extension is engaged, it is not necessary to compile all the extensions of the application. For instance, it is possible to compile only the features of the extension that are going to be used.

Assume for purposes of illustration that the portal is informed that there is a SQL server experience. The portal knows of the SQL server, but has not loaded any of the code. If a user provides an instruction to create a SQL server database, the shell may then acquire the code (i.e., the set of artifacts) to create the SQL server database. If the user then provides an instruction to manage the SQL server database, the shell may then acquire the set of screens that are configured to surface the database.

For example, the extension developer can create different bundles that correspond to the various functionalities that are associated with the extension so that it is not necessary to load the entire extension to surface UI. Rather, the shell may load only the bundles that are needed to surface the desired UI.

In accordance with this example, imagine that the extension developer decides that there are two scenarios: (1) creating a SQL server and (2) using a SQL server. The developer can create two bundles and load only the piece of UI that the developer needs. The developer can develop an extension that includes the two bundles and divide it into two distinct portions: (1) a manifest and (2) implementation code. The manifest is relatively small and is loaded when the port is loaded. The implementation code includes the two bundles, including a first bundle for creating the SQL server and a second bundle for using the SQL server. The implementation code can scale with the complexity of the experiences. The implementation code may be divided (e.g., by extension partner teams) in a way that can be incrementally loaded onto the client (e.g., any of client devices 102A-102M) as required by the user experience. In this example, the implementation code is divided into the first bundle and the second bundle, as mentioned above, for purposes of illustration.

The manifest identifies (e.g., describes) the existence of certain UI artifacts (e.g., a screen). If the user clicks on a website, for example, the shell may review the manifest to determine the screen to provide to the user. The manifest indicates that such a screen exists. For instance, the manifest may indicate that if the user clicks on a website, a designated screen is to be loaded from a designated extension. Accordingly, the manifest may serve as the entry point(s) for a designated user experience for the designated extension. The manifest may describe the entry point(s) in terms of the UI artifacts. For example, if the user clicks on a website in the user experience, the shell calls the website based on the manifest. The manifest makes the shell aware that such a screen exists.

The shell can interrogate the extension as a loading operation is initiated to instruct the extension to provide the implementation code for only the desired screen. Accordingly, during the loading operation, the shell may load the desired screen without all the other pieces of UI that are capable of being shown in the portal. Thus, metadata in the manifest informs the shell about the screens (e.g., blades and tiles) that are the entry points into the user experience of the extension. Then the extension itself controls how much or how little of the code is to be loaded when the extension is asked to put that UI on the screen.

The metadata in the manifest may indicate what kind of screens the extension is capable of projecting, what kind of capabilities the extension has, and/or what kind of assets the extension understands. When the portal loads, the manifests of extensions that are associated with the application are loaded. The metadata in the manifests may describe all the extensions that the portal has, thereby enabling the shell to run an extension (or portion thereof) only when a user engages with a specified capability or a specified screen. At that point, the shell may identify the desired extension and load only the relevant portion(s) of the implementation code that are included in the desired extension.

For instance, a manifest for a website extension may indicate that if the user desires to create a website, a first screen is to be shown to the user. The manifest may indicate that if the user wants to monitor a website that the user has already created, a second screen is to be shown to the user. Over all extensions, many of them may have "create" screens, and many of them may have "monitoring" screens. Accordingly, the manifests for the extensions may be similar in their schema, though the scope of the example embodiments is not limited in this respect. For instance, each of the manifests may indicate a respective first screen for creating something (e.g., a website) and a respective second screen for monitoring something (e.g., the website). The manifest may indicate that if the user wants to put UI on the screen, the UI is available from a designated extension. The manifest therefore may serve as a directory of the UI that the shell can put on the screen.

A manifest may present a page and not the substance behind the page. For instance, if a user wants to create a website, the user may click through the UI in such a way that the shell becomes aware that the user intends to create the website. The shell may then load a portion of the implementation code that pertains only to that screen. In doing so, the extension decides how much or how little code it needs to load to support that screen. If the extension developer chooses to optimize the extension, the developer can build the extension in such a way that a minimal amount of implementation code is loaded to support just that one screen. Other extensions may not be that optimized. For instance, some extensions may be configured to cause their entire implementation code to be loaded (e.g., the implementation for that screen and all other supporting screens). The manifest therefore may serve as a directory of screens that the extension can support.

As mentioned above, a manifest may describe capabilities and/or functionalities that the extension provides. For example, a "functionality" may be opening screens for creating and/or monitoring assets. A "capability" may be opening screens or showing notifications. A user may interact with the chrome of the shell and indicate that something is to be created. For instance, the user may indicate that a website is to be created. The manifest may list that a specified extension supports the creation of a website. Based on the manifest, the shell knows to put "website" as a category into the list that is presented to the user when the user wants to create something. The manifest may indicate a screen that the shell is to render when the user clicks on "website" in that list. The manifest may indicate the name of a screen that the shell is to render that allows the user to provide input into a form to create the website. For instance, the input may include a name and other attributes of the website. The name of that screen is in the metadata and is a part of the "create" capability.

If a user needs to browse through different assets, the shell may show the assets that are available to the user. The manifest may declare the assets as types. For a web application, the manifest may indicate that the web application has a specified name and a specified icon. In this example implementation, the manifest has enough information to provide the UI for browsing without having to load the implementation code of the extension.

An extension need not necessarily create its manifest. Rather, the manifest may be created automatically by the extension virtualization logic (e.g., extension virtualization logic 108). For instance, automatically creating the manifest may allow the example techniques described herein to scale. For instance, the example techniques may impose no additional cost to an extension developer, as compared to conventional techniques for developing extensions. Accordingly, the extension virtualization logic may be capable of determining a minimum amount of information that is needed to implement a user experience based on an analysis of the extension.

III. Further Discussion of Some Example Embodiments

In a first example method, a portal of an application that is associated with an extension is loaded using a processor of a computing system. The extension includes a manifest and implementation code. The manifest includes metadata that identifies a user interface element that indicates an asset that is accessible via the application. The implementation code is configured to implement the user interface element. The metadata is loaded, using a processor of the computing system, in response to loading the portal. Waiting to load the implementation code is performed until a user interacts with the user interface element, in response to loading the portal.

In a first aspect of the first example method, the first example method further comprises loading the implementation code in response to the user interacting with the user interface element. In accordance with the first aspect, the first example method further comprises running the implementation code in a sandboxed manner.

In a second aspect of the first example method, the metadata describes a hub in a jump bar that is defined by the application. The second aspect of the first example method may be implemented in combination with the first aspect of the first example method, though the example embodiments are not limited in this respect.

In a third aspect of the first example method, the metadata describes a tile on a start screen of the application. The third aspect of the first example method may be implemented in combination with the first and/or second aspect of the first example method, though the example embodiments are not limited in this respect.

In a fourth aspect of the first example method, the metadata indicates that the extension is capable of providing a screen through which functionality of the extension is accessible. The fourth aspect of the first example method may be implemented in combination with the first, second, and/or third aspect of the first example method, though the example embodiments are not limited in this respect.

In fifth aspect of the first example method, the metadata indicates that the extension is capable of monitoring the asset. The fifth aspect of the first example method may be implemented in combination with the first, second, third, and/or fourth aspect of the first example method, though the example embodiments are not limited in this respect.

In a sixth aspect of the first example method, the metadata indicates that the extension is capable of showing a notification regarding the asset. The sixth aspect of the first example method may be implemented in combination with the first, second, third, fourth, and/or fifth aspect of the first example method, though the example embodiments are not limited in this respect.

In a seventh aspect of the first example method, the metadata indicates that the extension supports creation of a website. The seventh aspect of the first example method may be implemented in combination with the first, second, third, fourth, fifth, and/or sixth aspect of the first example method, though the example embodiments are not limited in this respect.

In an eighth aspect of the first example method, the metadata indicates that the extension supports creation of a database. The eighth aspect of the first example method may be implemented in combination with the first, second, third, fourth, fifth, sixth, and/or seventh aspect of the first example method, though the example embodiments are not limited in this respect.

In a ninth aspect of the first example method, the implementation code is configured to bootstrap the extension. The ninth aspect of the first example method may be implemented in combination with the first, second, third, fourth, fifth, sixth, seventh, and/or eighth aspect of the first example method, though the example embodiments are not limited in this respect.

In a tenth aspect of the first example method, the metadata includes information that enables a notification regarding the asset to be provided without the implementation code being loaded. The tenth aspect of the first example method may be implemented in combination with the first, second, third, fourth, fifth, sixth, seventh, eighth, and/or ninth aspect of the first example method, though the example embodiments are not limited in this respect.

In an eleventh aspect of the first example method, the metadata includes information pertaining to a tile gallery. The tile gallery includes tiles that are configured to provide representations of aspects of assets that are accessible via the application. The tiles include the user interface element. The eleventh aspect of the first example method may be implemented in combination with the first, second, third, fourth, fifth, sixth, seventh, eighth, ninth, and/or tenth aspect of the first example method, though the example embodiments are not limited in this respect.

In a twelfth aspect of the first example method, the metadata includes a uniform resource identifier that identifies a location of the asset. The twelfth aspect of the first example method may be implemented in combination with the first, second, third, fourth, fifth, sixth, seventh, eighth, ninth, tenth, and/or eleventh aspect of the first example method, though the example embodiments are not limited in this respect.

In a thirteenth aspect of the first example method, the first example method further comprises executing the implementation code. In accordance with the thirteenth aspect, the first example method further comprises unloading the implementation code without unloading the metadata, in response to executing the implementation code. The thirteenth aspect of the first example method may be implemented in combination with the first, second, third, fourth, fifth, sixth, seventh, eighth, ninth, tenth, eleventh, and/or twelfth aspect of the first example method, though the example embodiments are not limited in this respect.

In a fourteenth aspect of the first example method, the first example method further comprises displaying the user interface element on a display of the computing system. In accordance with the fourteenth aspect, the first example method further comprises executing the implementation code. In further accordance with the fourteenth aspect, the first example method further comprises determining that the user interface element is no longer displayed on the display. In further accordance with the fourteenth aspect, the first example method further comprises automatically unloading the implementation code in response to determining that the user interface element is no longer displayed on the display. The fourteenth aspect of the first example method may be implemented in combination with the first, second, third, fourth, fifth, sixth, seventh, eighth, ninth, tenth, eleventh, twelfth, and/or thirteenth aspect of the first example method, though the example embodiments are not limited in this respect.

In a fifteenth aspect of the first example method, the first example method further comprises automatically determining a functionality provided by the extension. In accordance with the fifteenth aspect, the first example method further comprises automatically generating the metadata to indicate the functionality in response to automatically determining the functionality. The fifteenth aspect of the first example method may be implemented in combination with the first, second, third, fourth, fifth, sixth, seventh, eighth, ninth, tenth, eleventh, twelfth, thirteenth, and/or fourteenth aspect of the first example method, though the example embodiments are not limited in this respect.

In a sixteenth aspect of the first example method, loading the metadata comprises causing the user interface element to be displayed on a display of the computing system. The sixteenth aspect of the first example method may be implemented in combination with the first, second, third, fourth, fifth, sixth, seventh, eighth, ninth, tenth, eleventh, twelfth, thirteenth, fourteenth, and/or fifteenth aspect of the first example method, though the example embodiments are not limited in this respect.

In a seventeenth aspect of the first example method, the implementation code is configured to provide functionality associated with the user interface element. The seventeenth aspect of the first example method may be implemented in combination with the first, second, third, fourth, fifth, sixth, seventh, eighth, ninth, tenth, eleventh, twelfth, thirteenth, fourteenth, fifteenth, and/or sixteenth aspect of the first example method, though the example embodiments are not limited in this respect.

A first example system comprises an element comprising at least one of a processor or hardware logic/electrical circuitry. Loading logic, implemented using the element, is configured to load a portal of an application that is associated with an extension. The extension includes a manifest and implementation code. The manifest includes metadata that identifies a user interface element that indicates an asset that is accessible via the application. The implementation code is configured to implement the user interface element. The loading logic is further configured to load the metadata in response to the portal being loaded. Delaying logic, implemented using the element, is configured to delay loading of the implementation code until a user interacts with the user interface element, in response to the metadata being loaded.

In a first aspect of the first example system, the loading logic is further configured to load the implementation code in response to the user interacting with the user interface element. In accordance with the first aspect, the first example system further comprises execution logic configured to run the implementation code in a sandboxed manner.

In a second aspect of the first example system, the metadata describes a hub in a jump bar that is defined by the application. The second aspect of the first example system may be implemented in combination with the first aspect of the first example system, though the example embodiments are not limited in this respect.

In a third aspect of the first example system, the metadata describes a tile on a start screen of the application. The third aspect of the first example system may be implemented in combination with the first and/or second aspect of the first example system, though the example embodiments are not limited in this respect.

In a fourth aspect of the first example system, the metadata indicates that the extension is capable of providing a screen through which functionality of the extension is accessible. The fourth aspect of the first example system may be implemented in combination with the first, second, and/or third aspect of the first example system, though the example embodiments are not limited in this respect.

In fifth aspect of the first example system, the metadata indicates that the extension is capable of monitoring the asset. The fifth aspect of the first example system may be implemented in combination with the first, second, third, and/or fourth aspect of the first example system, though the example embodiments are not limited in this respect.

In a sixth aspect of the first example system, the metadata indicates that the extension is capable of showing a notification regarding the asset. The sixth aspect of the first example system may be implemented in combination with the first, second, third, fourth, and/or fifth aspect of the first example system, though the example embodiments are not limited in this respect.

In a seventh aspect of the first example system, the metadata indicates that the extension supports creation of a website. The seventh aspect of the first example system may be implemented in combination with the first, second, third, fourth, fifth, and/or sixth aspect of the first example system, though the example embodiments are not limited in this respect.

In an eighth aspect of the first example system, the metadata indicates that the extension supports creation of a database. The eighth aspect of the first example system may be implemented in combination with the first, second, third, fourth, fifth, sixth, and/or seventh aspect of the first example system, though the example embodiments are not limited in this respect.

In a ninth aspect of the first example system, the implementation code is configured to bootstrap the extension. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the metadata includes information that enables a notification regarding the asset to be provided without the implementation code being loaded. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the metadata includes information pertaining to a tile gallery. The tile gallery includes tiles that are configured to provide representations of aspects of assets that are accessible via the application. The tiles include the user interface element. The eleventh aspect of the first example system may be implemented in combination with the first, second, third, fourth, fifth, sixth, seventh, eighth, ninth, and/or tenth aspect of the first example system, though the example embodiments are not limited in this respect.

In a twelfth aspect of the first example system, the metadata includes a uniform resource identifier that identifies a location of the asset. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

In a thirteenth aspect of the first example system, the first example system further comprises execution logic configured to execute the implementation code. In accordance with the thirteenth aspect, the loading logic is further configured to unload the implementation code without unloading the metadata, in response to execution of the implementation code. The thirteenth aspect of the first example system may be implemented in combination with the first, second, third, fourth, fifth, sixth, seventh, eighth, ninth, tenth, eleventh, and/or twelfth aspect of the first example system, though the example embodiments are not limited in this respect.

In a fourteenth aspect of the first example system, the first example system further comprises a display. In accordance with the fourteenth aspect, the first example system further comprises display logic configured to display the user interface element on a display. In accordance with the fourteenth aspect, the first example system further comprises execution logic configured to execute the implementation code. In further accordance with the fourteenth aspect, the first example system further comprises determination logic configured to determine whether the user interface element is still displayed on the display. In further accordance with the fourteenth aspect, the loading logic is further configured to automatically unload the implementation code in response to a determination that the user interface element is not still displayed on the display. The fourteenth aspect of the first example system may be implemented in combination with the first, second, third, fourth, fifth, sixth, seventh, eighth, ninth, tenth, eleventh, twelfth, and/or thirteenth aspect of the first example system, though the example embodiments are not limited in this respect.

In a fifteenth aspect of the first example system, the first example system further comprises determination logic configured to automatically determine a functionality provided by the extension. In accordance with the fifteenth aspect, the first example system further comprises generation logic configured to automatically generate the metadata to indicate the functionality in response to the functionality being automatically determined. The fifteenth aspect of the first example system may be implemented in combination with the first, second, third, fourth, fifth, sixth, seventh, eighth, ninth, tenth, eleventh, twelfth, thirteenth, and/or fourteenth aspect of the first example system, though the example embodiments are not limited in this respect.

In a sixteenth aspect of the first example system, the loading logic is configured to cause the user interface element to be displayed on a display of the computing system without the implementation code being loaded. The sixteenth aspect of the first example system may be implemented in combination with the first, second, third, fourth, fifth, sixth, seventh, eighth, ninth, tenth, eleventh, twelfth, thirteenth, fourteenth, and/or fifteenth aspect of the first example system, though the example embodiments are not limited in this respect.

In a seventeenth aspect of the first example system, the implementation code is configured to provide functionality associated with the user interface element. The seventeenth aspect of the first example system may be implemented in combination with the first, second, third, fourth, fifth, sixth, seventh, eighth, ninth, tenth, eleventh, twelfth, thirteenth, fourteenth, fifteenth, and/or sixteenth aspect of the first example system, though the example embodiments are not limited in this respect.

An example computer program product comprises a computer-readable storage medium having computer program logic recorded thereon for enabling a processor-based system to virtualize third-party extension code. The computer program logic comprises first program logic and second program logic. The first program logic is for enabling the processor-based system to load a portal of an application that is associated with an extension. The extension includes metadata and implementation code. The metadata identifies a user interface element that indicates an asset that is accessible via the application. The implementation code is configured to implement the user interface element. The first program logic is further for enabling the processor-based system to load the metadata in response to the portal being loaded. The second program logic is for enabling the processor-based system to delay loading of the implementation code until a user interacts with the user interface element, in response to the metadata being loaded.

IV. Example Computer System

Figure 9:
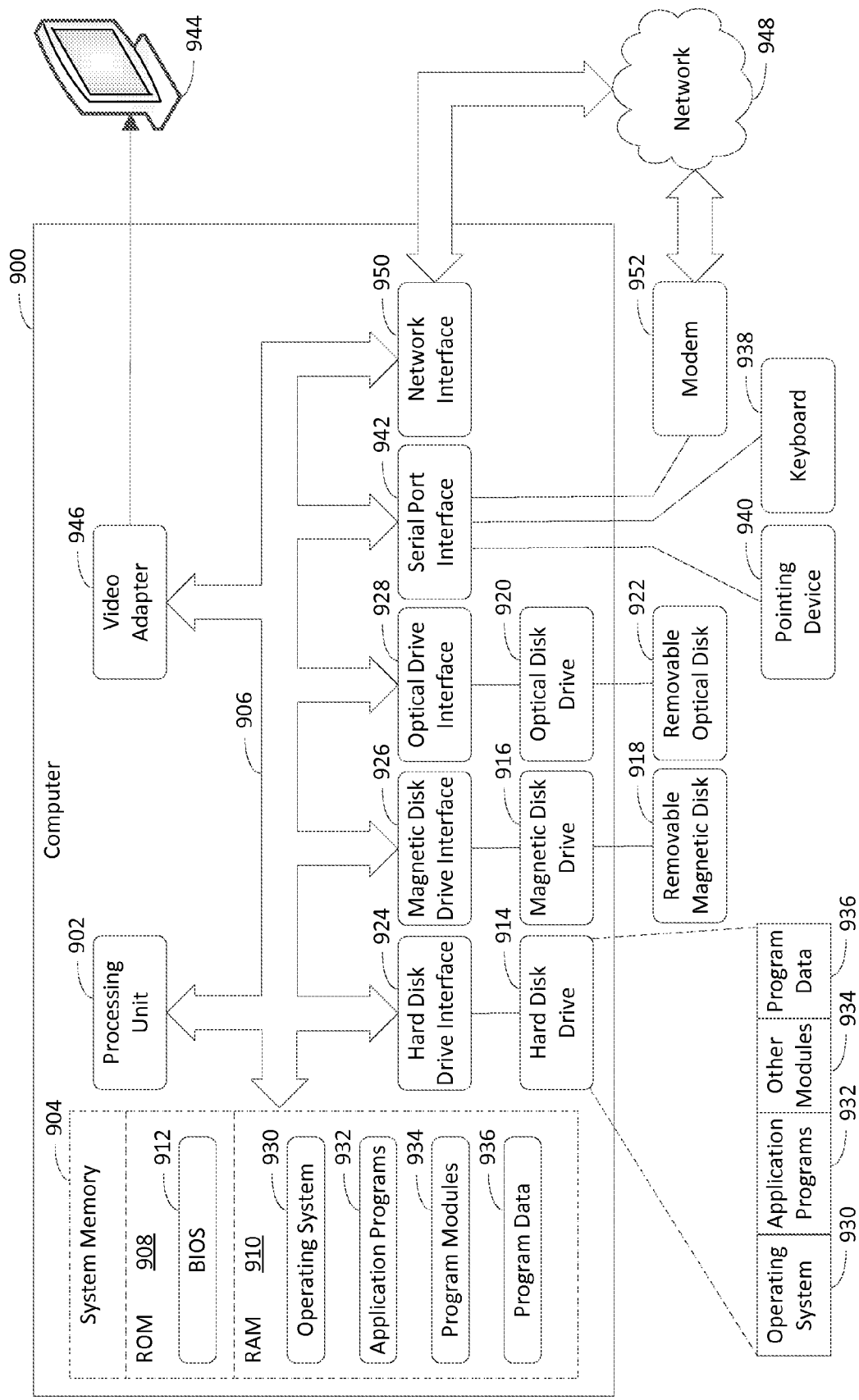
FIG. 9 depicts an example computer in which embodiments may be implemented.

FIG. 9 depicts an example computer 900 in which embodiments may be implemented. Any one or more of client devices 102A-102M, any one or more of machines 106A-106N, and/or extension virtualization logic 108 shown in FIG. 1; and/or computing system 800 shown in FIG. 8 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of extension virtualization logic 108, extension virtualization logic 804, loading logic 810, delaying logic 812, execution logic 814, display logic 816, determination logic 818, generation logic 820, flowchart 500 (including any step of flowchart 500), flowchart 600 (including any step of flowchart 600), and/or flowchart 700 (including any step of flowchart 700), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to reduce an amount of resources consumed to use extension code in an application, the system comprising:
an element comprising at least one of (a) a processor, (b) hardware logic, or (c) electrical circuitry;
loading logic, implemented using the element, configured to load a portal of an application, the portal having an extensibility point via which an extension is to enhance functionality of the application,
the extension including a manifest and implementation code,
the manifest including metadata that identifies a user interface element that indicates an asset that is accessible via the application,
the implementation code configured to implement the user interface element by at least one of opening a first blade that enables a user to create the asset or opening a second blade that enables the user to monitor the asset,
the loading logic further configured to load the metadata in response to the portal being loaded; and
delaying logic, implemented using the element, configured to delay loading of the implementation code, which delays the at least one of opening the first blade that enables the user to create the asset or opening the second blade that enables the user to monitor the asset, until an interaction indicator is received, in response to the metadata being loaded,
the interaction indicator indicating that the user interacts with the user interface element,
the loading logic further configured to load the implementation code based at least in part on receipt of the interaction indicator.

2. The system of claim 1, wherein the system further comprises:
execution logic configured to run the implementation code in a sandboxed manner.

3. The system of claim 1, wherein the metadata describes a hub in a jump bar that is defined by the application.

4. The system of claim 1, wherein the implementation code is configured to bootstrap the extension.

5. The system of claim 1, wherein the metadata includes information that enables a notification regarding the asset to be provided without the implementation code being loaded, the notification configured to at least one of (A) inform the user of an event that has occurred or (B) inform the user of an event that is anticipated to occur.

6. The system of claim 1, further comprising:
a display;
display logic configured to display the user interface element on the display;
execution logic configured to execute the implementation code; and
determination logic configured to determine whether the user interface element is still displayed on the display;
wherein the loading logic is further configured to automatically unload the implementation code in response to a determination that the user interface element is not still displayed on the display.

7. The system of claim 1, further comprising:
determination logic configured to automatically determine a functionality provided by the extension; and
generation logic configured to automatically generate the metadata to indicate the functionality in response to the functionality being automatically determined.

8. A method of reducing an amount of resources consumed to use extension code in an application, the method comprising:
loading, using a processor of a computing system, a portal of an application, the portal having an extensibility point via which an extension is to enhance functionality of the application, the extension including a manifest and implementation code, the manifest including metadata that identifies a user interface element that indicates an asset that is accessible via the application, the implementation code configured to implement the user interface element by at least one of opening a first blade that enables a user to create the asset or opening a second blade that enables the user to monitor the asset;

loading, using a processor of the computing system, the metadata in response to loading the portal;

waiting to load the implementation code, which includes waiting to at least one of open the first blade that enables the user to create the asset or open the second blade that enables the user to monitor the asset, until an interaction indicator is received, in response to loading the portal, the interaction indicator indicating that the user interacts with the user interface element;

receiving the interaction indicator; and loading the implementation code based at least in part on receipt of the interaction indicator.

9. The method of claim 8, further comprising:

running the implementation code in a sandboxed manner.

10. The method of claim 8, wherein the metadata indicates that the extension is capable of providing a screen through which functionality of the extension is accessible.

11. The method of claim 8, wherein the metadata indicates that the extension is capable of monitoring the asset.

12. The method of claim 8, wherein the metadata indicates that the extension supports creation of at least one of a website or a database.

13. The method of claim 8, further comprising:

executing the implementation code; and unloading the implementation code without unloading the metadata, in response to executing the implementation code.

14. The method of claim 8, further comprising:

automatically determining a functionality provided by the extension; and automatically generating the metadata to indicate the functionality in response to automatically determining the functionality.

15. The method of claim 8, wherein loading the metadata comprises:

causing the user interface element to be displayed on a display of the computing system.

16. A system to reduce an amount of resources consumed to use extension code in an application, the system comprising:

an element comprising at least one of (a) a processor, (b) hardware logic, or (c) electrical circuitry, the element configured to load a portal of an application, the portal having an extensibility point via which an extension is to enhance functionality of the application, the extension including metadata and implementation code, the metadata describing a user experience that the implementation code is configured to provide with regard to the application, the element further configured to load the metadata in response to the portal being loaded, and the element further configured to delay loading of the implementation code, which delays at least one of opening a first blade that enables a user to create an asset or opening a second blade that enables the user to monitor the asset, until an interaction indicator is received, in response to the metadata being loaded, the interaction indicator indicating that a user interaction occurs, the element further configured to load the implementation code based at least in part on receipt of the interaction indicator.

17. The system of claim 16, wherein the system further comprises:

execution logic configured to run the implementation code in a sandboxed manner.

18. The system of claim 16, wherein the metadata indicates that the extension is capable of showing a notification, the notification configured to at least one of (A) inform the user of an event that has occurred or (B) inform the user of an event that is anticipated to occur.

19. The system of claim 16, wherein the metadata includes information pertaining to a tile gallery, the tile gallery including tiles that are configured to provide representations of aspects of assets that are accessible via the application.

20. The system of claim 1, wherein the metadata indicates that the extension is capable of providing at least one of the first blade that enables the user to create the asset or the second blade that enables the user to monitor the asset.

* * * * *